Figures 1, 2:
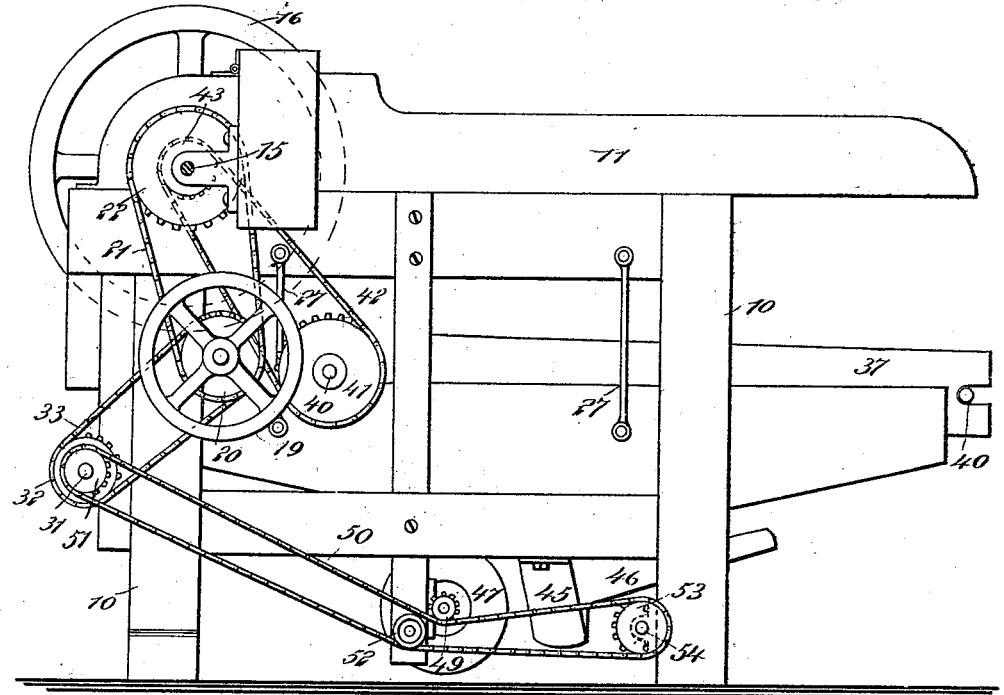

(No Model.)

A. PETERSON.
CORN SHELLER.

No. 544,589. Patented Aug. 13, 1895.

WITNESSES:
Johnas Bergstrom
W. P. Hutchinson

INVENTOR
A. Peterson
BY
Munn & Co
ATTORNEYS.

UNITED STATES PATENT OFFICE.

ALBERT PETERSON, OF CAMBRIDGE, ILLINOIS.

CORN-SHELLER.

SPECIFICATION forming part of Letters Patent No. 544,589, dated August 13, 1895.

Application filed January 29, 1895. Serial No. 536,558. (No model.)

*To all whom it may concern:*

Be it known that I, ALBERT PETERSON, of Cambridge, in the county of Henry and State of Illinois, have invented a new and Improved Combined Fodder-Cutter and Corn-Sheller, of which the following is a full, clear, and exact description.

My invention relates to improvements in combined fodder-cutters and corn-shellers; and the object of my invention is to produce a machine which is adapted to cut up fodder with the corn-ears thereon and then separate the shelled corn from the fodder and cobs.

Another object of my invention is to construct and arrange the shelling and separating mechanism in such a way that it may be used in connection with an ordinary corn-cutter and may be made to shell corn very rapidly and to clean it nicely.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a side elevation of the machine embodying my invention, and Fig. 2 is a central vertical longitudinal section of the same.

The machine is provided with a suitable frame 10, the feed-trough 11, the feed-rolls 12, the downwardly-extending stationary knife 14, the revoluble cutter 13, which moves upwardly toward the fixed knife and is inclosed at its upper part by a curved casing, as shown in the drawings, serving to deflect downward the cut corn and fodder passing over the cutter, the shaft 15 to carry the revoluble cutter, and the balance-wheel 15 for the shaft.

The driving-shaft 15 may be turned either by hand or power, and immediately beneath it is a revoluble shelling-cylinder 16, which revolves in the same direction as the cutter, is preferably hollow, and is provided with projecting rows of teeth 17, these being secured to bars 18, which are fastened to the face of the cylinder; but the teeth may be secured to the cylinder in any other suitable manner.

The shaft of the cylinder 16 is provided with a balance-wheel 19 to impart a steady motion to the cylinder, and also with a sprocket-wheel 20, which is driven by a chain 21, connecting with the sprocket-wheel 22 on the driving-shaft 15. The shelling-cylinder 16 revolves opposite fixed teeth 23 on a concaved support 24, which is secured to the frame 10 of the machine. The concaved support forms a continuation of the curved casing inclosing the upper part of the revoluble cutter, and is curved at its lower end to deflect the material outward.

The cylinder 16, as it revolves, causes the cut material to be shredded and torn up and the whole mass is delivered upon the shaking screen 25, which has perforations in it large enough to permit the kernels of corn to drop through; but the other matter is carried rearward, as hereinafter described.

The shaking screen 25 is carried by the concaved shaker 26, which is movable back and forth and extends the full length of the machine. The shaker is hung on rods 27, which are suspended from the sides of the machine, and it is moved by a pitman 28, which connects it with a crank 29 on the wheel 30, which is secured to the shaft 31, (see Fig. 1,) and this shaft is provided with a sprocket-wheel 32, which is driven by a chain 33, connecting with a sprocket-wheel on the shaft of the beating-cylinder. The fodder, after being cut and shredded, is carried slowly back over the shaking screen 25 by the endless rake 34, which is arranged above the screen and converges toward it near the tail end of the screen. The rake comprises endless sprocket-chains 35 and connecting cross-bars 36, the whole affair being carried in a frame 37 and provided with the usual transverse guide-bar 38. The chains 36 run over sprocket-wheels 39 on the shafts 40 at the ends of the frame 37, and the forward shaft is provided with a sprocket-wheel 41, which is driven by a chain 42, connecting with a sprocket-wheel 43 on the driving-shaft 15. The rake, as above remarked, carries the fodder backward over the screen, which, being kept in a constant motion, causes the corn to drop through it and the corn is caught on the shaker 26 and carried through a hole 44 in the shaker bottom to a spout 45, which leads to one side of the machine, and here the corn may be caught in any suitable receptacle. The spout has a rearwardly-extending chute 46 at one side, which inclines toward the spout, while on the other side is a revoluble fan 47, which delivers through an opening 48 at a point between the spout 45 and the opening 44 in the shaker 26, and so the fan, which is kept in constant motion, causes a blast of air to traverse the path of the descending corn and so blow out any foreign matter. The corn then drops clean into the spout and is conveyed away. The fan 47 has its shaft provided with a sprocket-wheel 49, (see Fig. 1,) which is driven by a chain 50, connecting with a sprocket-wheel 51 on the shaft 31, and beneath a belt-tightener 52 and around an idler 53 on the shaft 54, which is journaled on the frame 10.

When the material is placed in the trough and the machine is started, it will be seen that a continuous stream of material is thrown from the cutter 13 downward between the concaved support and the shelling-cylinder 16, where it is shredded and subdivided and then delivered to the screen 25, which separates the corn from the fodder, as already described, while the fodder is pushed slowly out of the machine by the rake 34, being delivered at the same end as that at which the material is fed, and the corn is delivered clean from the spout 45.

It will be readily seen that my improved separator mechanism may be used in connection with any usual form of cutter, and it will also be noticed that while I have shown a certain particular arrangement of chains and sprocket-wheels to drive the moving parts of the apparatus, other driving mechanism may be employed without affecting the principle of my invention.

Having thus described my invention, I claim as new and desire to secure by Letters Patent—

The combination with the feed rolls, the stationary knife and the revoluble cutter, moving upwardly thereto, of the curved casing partly inclosing the upper part of the revoluble cutter and serving to deflect downward the cut corn and fodder passing over the cutter, the concaved support provided with teeth and forming a downward continuation of the curved casing and having a curved lower end serving to deflect the material outward, the toothed shelling cylinder revolving in the same direction as the revoluble cutter, the shaking screen below the shelling cylinder upon which the shelled corn and the shredded material is deflected from the concaved support, and the endless chain rake located above the screen with its discharging end converging toward the screen, whereby the mechanism which cuts, shreds, shells and separates the material is caused to conduct the same continuously through the machine, the fodder being delivered at the same end as that at which the material is fed, substantially as described.

ALBERT PETERSON.

Witnesses:
J. G. A. GUSTAFSON,
ED. SAMUELSON.